(12) United States Patent
Shimamura et al.

(10) Patent No.: US 6,425,379 B2
(45) Date of Patent: Jul. 30, 2002

(54) EVAPORATIVE EMISSION CONTROL SYSTEM

(75) Inventors: Hiroshi Shimamura; Norikazu Sugimura, both of Sashima-gun; Koji Suguira; Hidemi Masuda, both of Toyota, all of (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 09/740,845

(22) Filed: Dec. 21, 2000

(30) Foreign Application Priority Data

Dec. 27, 1999 (JP) .......................... 11-369719

(51) Int. Cl.[7] .......................... F02M 37/04; F16K 24/04
(52) U.S. Cl. .......................... 123/516; 137/202; 137/43
(58) Field of Search .................. 137/43, 202; 251/126, 251/127

(56) References Cited

U.S. PATENT DOCUMENTS

| | | | | |
|---|---|---|---|---|
| 5,392,804 A | * | 2/1995 | Kondo et al. | 137/202 |
| 5,711,339 A | * | 1/1998 | Kurihara | 137/202 |
| 6,035,884 A | * | 3/2000 | King et al. | 137/202 |
| 6,058,970 A | | 5/2000 | Osaki et al. | |
| 6,062,250 A | * | 5/2000 | Takahashi | 137/202 |
| 6,145,532 A | * | 11/2000 | Tuckey | 137/202 |
| 6,311,675 B2 | * | 11/2001 | Crary et al. | 137/43 |

OTHER PUBLICATIONS

1999 Service Manual Cirrus, Stratus and Breeze, Chrysler Corporation, 1998.

\* cited by examiner

*Primary Examiner*—Thomas N. Moulis
(74) *Attorney, Agent, or Firm*—Oliff & Berridge PLC

(57) ABSTRACT

An evaporative emission control system is provided which includes an upper valve casing defining a vent conduit, a lower valve casing disposed under the upper valve casing, and a float disposed within the lower valve casing. The float is vertically movable depending upon a liquid level of fuel in a fuel tank, and includes a valve portion that faces the upper valve casing. A valve port formed between the upper valve casing and the lower valve casing is opened and closed by the valve portion of the float. The upper valve casing defines a space between the vent conduit and the valve port. A flow restricting device is disposed in the space of the upper valve casing so as to obstruct flow of fuel from the valve port to the vent conduit.

13 Claims, 12 Drawing Sheets

EVAPORATIVE EMISSION CONTROL SYSTEM

INCORPORATION BY REFERENCE

The disclosure of Japanese Patent Application No. HEI 11-369719 filed on Dec. 27, 1999 including the specification, drawings and abstract is incorporated herein by reference in its entirety.

BACKGROUND OF THE INVENTION

1. Field of the Invention

The invention relates to an evaporative emission control system that prevents fuel vapors in a vehicular fuel tank from being discharged into the atmosphere and, more particularly, to an evaporative emission control system that prevents fuel from being transferred to a canister through a vapor vent line when the fuel tank is filled up and prevents fuel from flowing out of the tank when the vehicle inclines or rolls over.

2. Discussion of Related Art

A vehicular fuel tank is provided with a liquid level sensing valve, a fuel cut valve and the like. The liquid level sensing valve is adapted to close a vapor vent line when the tank is filled up. The fuel cut valve is adapted to close an evaporation line to prevent fuel from flowing out of the line, for example, when the vehicle inclines or rolls over. Each of these valves includes a float that vertically moves in accordance with the liquid level of the fuel.

Hereinafter, one example of evaporative emission control systems as part of the related art will be described with reference to FIG. 1. A valve casing 4 incorporating a liquid level sensing valve 2 and a fuel cut valve 3 formed as a unit is mounted on the fuel tank 1. The valve casing 4 is composed of a lower valve casing 4A and an upper valve casing 4B disposed above the lower valve casing 4A. A liquid level sensing float 5 and a fuel cut float 6 are disposed in the lower valve casing 4A.

A valve portion 7 is provided on an upper surface of the liquid level sensing float 5. Also, a valve portion 8 is provided by an upper portion of the fuel cut float 6. Valve ports 9, 10 are formed between the lower valve casing 4A and the upper valve casing 4B. The valve port 9 is opened and closed by the valve portion 7, and the valve port 10 is opened and closed by the valve portion 8. The upper valve casing 4B is provided with a vent conduit 11, which communicates with the valve port 9 through a space 12. The space 12 also communicates with the valve port 10 through a conduit 13.

The operation of the evaporative emission control system of the related art shown in FIG. 1 will be now described.

If the pressure of fuel vapors in the fuel tank 1 becomes high during refueling, fuel vapors flow through the valve port 9 formed in the valve casing 4, and are discharged into a canister (not shown), an intake pipe (not shown) and the like through the vent conduit 11, as indicated by arrow P in FIG. 1.

If the liquid level of the fuel in the fuel tank 1 is elevated, the liquid level sensing float 5 rises and the valve body 7 closes the valve port 9. This prevents fuel from being directly fed to the canister.

If the pressure of fuel vapors in the fuel tank 1 remains high during normal operations, the liquid level sensing float 5 sticks to the valve port 9. In this case, since the vent conduit 11 remains closed, it is necessary to reduce the pressure in the fuel tank 1. To this end, the pressure is released through the valve port of the fuel cut valve 23 so that the liquid level sensing float falls because of its own weight.

If the vehicle inclines by a large degree or rolls over, a large amount of fuel in the fuel tank 1 may flow towards the canister through the valve port 10 and the conduit 13. However, when the vehicle inclines by a large degree or rolls over, the fuel cut float 6 rises and the valve body 8 closes the valve port 10, whereby fuel is prevented from flowing out.

In the aforementioned structure as shown in FIG. 1, the liquid level sensing float 5 and the fuel cut float 6 are disposed in the same valve casing 4. However, other structures are also known in which the liquid level sensing float and the fuel cut float are individually disposed in separate valve casings.

Another example of evaporative emission control systems as part of the related art will be described with reference to FIG. 2. A liquid level sensing valve 22 and a fuel cut valve 23 are separately mounted on a fuel tank 21. A valve casing 24 of the liquid level sensing valve 22 is formed with a vent conduit 25, and a valve casing 26 of the fuel cut valve 23 is formed with a conduit 27. A space 28 is formed in the valve casing 24 of the liquid level sensing valve 22. A connection port 29 that extends from the space 28 is connected to the conduit 27 by means of a hose 30.

The example shown in FIG. 2 also performs substantially the same operation as the example shown in FIG. 1. That is, if the liquid level of fuel in the fuel tank 21 becomes high, the liquid level sensing valve 22 closes the vent conduit 25. This prevents fuel from being directly fed to the canister and the like.

If the pressure of fuel vapors in the fuel tank 21 remains high during normal operations, the float of the liquid level sensing valve 22 sticks to the valve port, and the vent conduit 25 remains closed. Therefore, it is necessary to reduce the pressure in the fuel tank 21. To this end, the pressure in the fuel tank 21 is released through the valve port of the fuel cut valve 23, so that the float of the liquid level sensing valve 22 falls because of its own weight.

If the vehicle inclines by a large extent or rolls over, a large amount of fuel in the fuel tank 21 may flow towards the canister through the valve port of the fuel cut valve 23 and the conduit 27. However, when the vehicle inclines by a large degree or rolls over, the float of the fuel cut valve 23 rises and the valve port is closed, whereby fuel is prevented from flowing out.

However, the aforementioned evaporative emission control systems as part of the related art have the following disadvantages.

First of all, since the space 12, 28 is directly connected to the vent conduit 11, 25 with no intervening member therebetween, the fuel that has leaked out from the valve port 9 due to vibration of the vehicle, or the like, may be transferred toward the canister and degrade the canister.

Furthermore, the valve port 9 may be directly exposed to the fuel in the fuel tank, and therefore the fuel is more likely to leak through the valve port 9.

With regard to the structure in which the connection port 29 of the liquid level sensing valve 22 and the conduit 27 of the fuel cut valve 23 are connected with each other by the hose 30, the connecting operation cannot be accomplished in a simple manner. It thus takes a lot of time and labor to provide the system as shown in FIG. 2, while requiring many types of parts or components.

SUMMARY OF THE INVENTION

It is thus an object of the invention to reduce or eliminate the disadvantages of the evaporative emission control systems as the related art, and to provide an evaporative emission control system that achieves reduction of the amount of leaking fuel, simplified procedure of mounting or connecting pipes, and reduction of the number of types of required parts or components.

To accomplish the above object, an evaporative emission control system is provided according to the present invention, which includes: an upper valve casing defining a vent conduit; a lower valve casing disposed under the upper valve casing; a float disposed within the lower valve casing, the float being vertically movable depending upon a liquid level of fuel in a fuel tank, the float including a valve portion that faces the upper valve casing; a valve port provided between the upper valve casing and the lower valve casing, the valve port being opened and closed by the valve portion of the float, the upper valve casing defining a space between the vent conduit and the valve port; and a flow restricting device disposed in the space of the upper valve casing so as to obstruct flow of fuel from the valve port to the vent conduit.

In one preferred form of the invention, the flow restricting device consists of a shield device that reduces a cross-sectional area of the space through which the valve port communicates with the vent conduit.

In another preferred form of the invention, the flow restricting device defines a helical passage in the space of the upper valve casing.

In a further preferred form of the invention, the flow restricting device consists of at least one partition wall that divides the space of the upper valve casing into two or more chambers that are arranged in a vertical direction. In this case, each of the partition walls has a through-hole formed therethrough.

The evaporative emission control system as described above may further include a cut valve having a vent port. In this system, the upper valve casing may be provided with a cut valve connection port that is open to the above-indicated space of the upper valve casing, and is connected to the vent port of the cut valve.

DETAILED DESCRIPTION OF PREFERRED EMBODIMENTS

Some preferred embodiments of the invention will be described with reference to the drawings.

The invention mainly has three features. As the first feature, an obstruction wall or walls for preventing flow of fuel between a space and a vent conduit in the liquid level sensing valve is provided for reducing the amount of fuel leaking from the fuel tank.

As the second feature, in order to prevent a valve port of the liquid level sensing valve from being directly exposed to fuel, the liquid level sensing valve is covered with a cylindrical cover.

As the third feature, a connection port of the liquid level sensing valve and a conduit of the fuel cut valve are connected to each other by a connector so that the connecting process can be quickly carried out in a simple manner, or may be connected by a hose, using a nipple fitted on the connection port to facilitate the connecting process. This leads to a reduction in the number of types of required parts or components.

Figure 3:
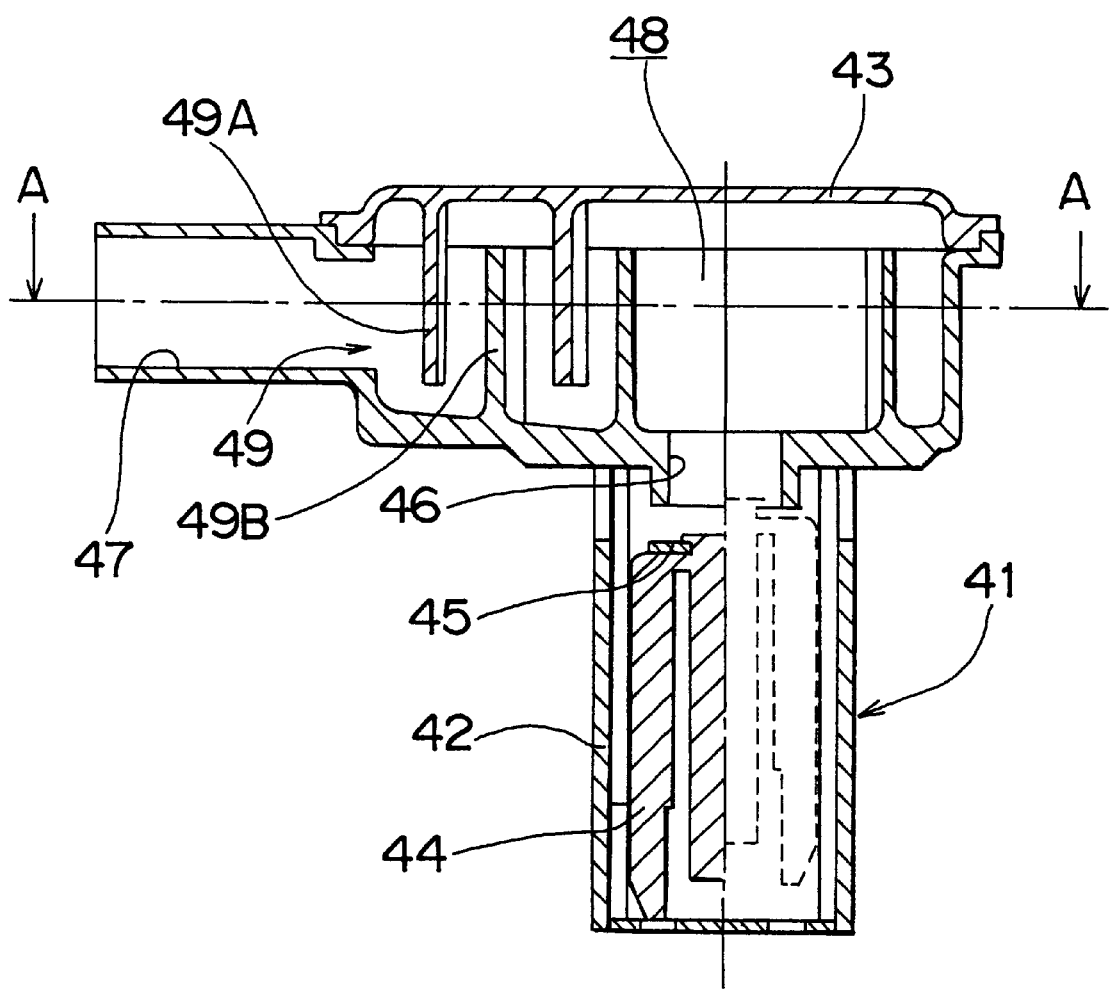
FIG. 3 is a cross-sectional view showing an evaporative emission control system according to a first embodiment of the invention.
Figure 4:
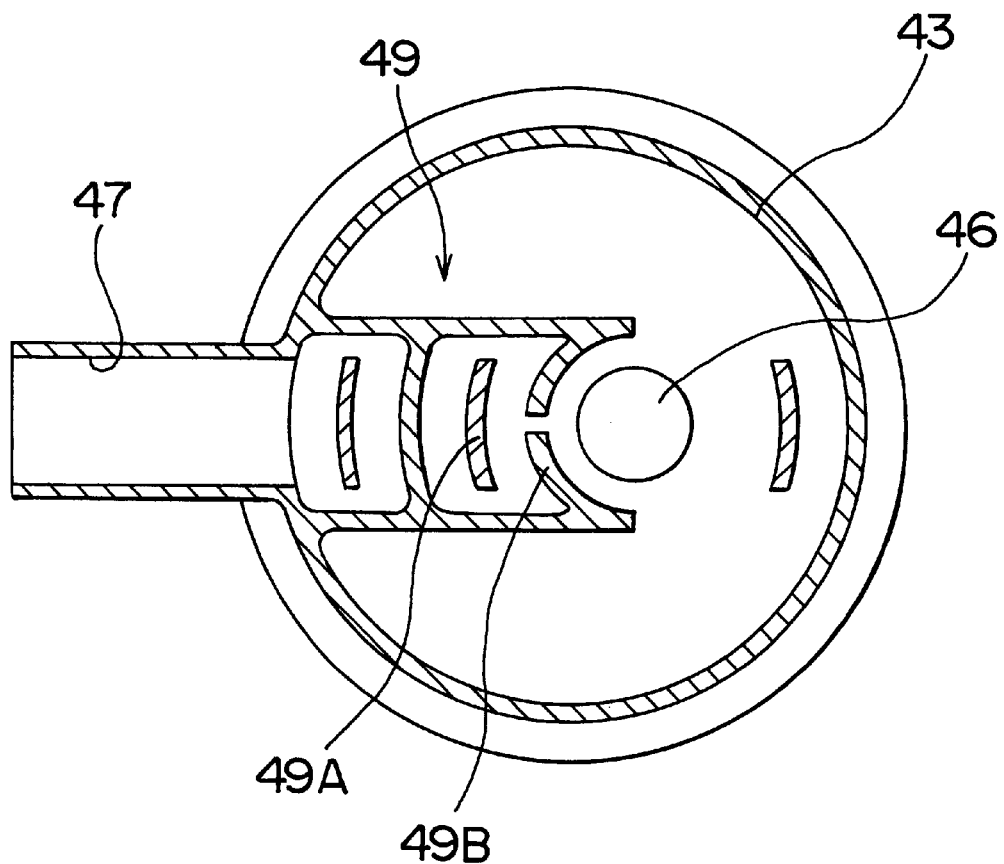
FIG. 4 is a cross-sectional view taken along line A—A of FIG. 3.

A first embodiment of the invention will be described with reference to FIGS. 3 and 4. This embodiment is characterized in that an obstruction wall or walls for preventing flow of fuel between a space and a vent conduit of a liquid level sensing valve is/are provided for reducing the amount of leaking fuel.

A valve casing of a liquid level sensing valve 41 is composed of a lower valve casing 42 and an upper valve casing 43 disposed above the lower valve casing 42.

A float 44 is disposed in the lower valve casing 42. A valve portion 45 is provided on an upper surface of the float 44. A valve port 46 is formed between the lower valve casing 42 and the upper valve casing 43. The valve port 46 is opened and closed by the valve portion 45. The upper valve casing 43 is formed with a vent conduit 47, and a space 48 is formed between the vent conduit 47 and the valve port 46.

With the above arrangement, the float 44 vertically moves in accordance with the level of the liquid surface in a fuel tank (not shown), and the valve portion 45 of the float 44 opens and closes the valve port 46, so that the vent conduit 47 communicates with the interior of the fuel tank when the valve port 46 is in the open state.

In this embodiment of the invention, a shield device 49 is disposed in the space 48 so as to reduce the cross-sectional area of the passage through which fuel vapors flow.

More specifically, the shield device 49 consists of alternately arranged shield members 49A, 49B. The shield members 49A protrude downwards from the upper wall of the upper casing 43, and the shield members 49B protrude upwards from the lower wall of the upper casing 43. While the shield members 49A, 49B are formed as integral parts of the upper casing 42 in this embodiment, the shield members may be provided as separate members formed independently of the upper casing 43.

Figure 1:
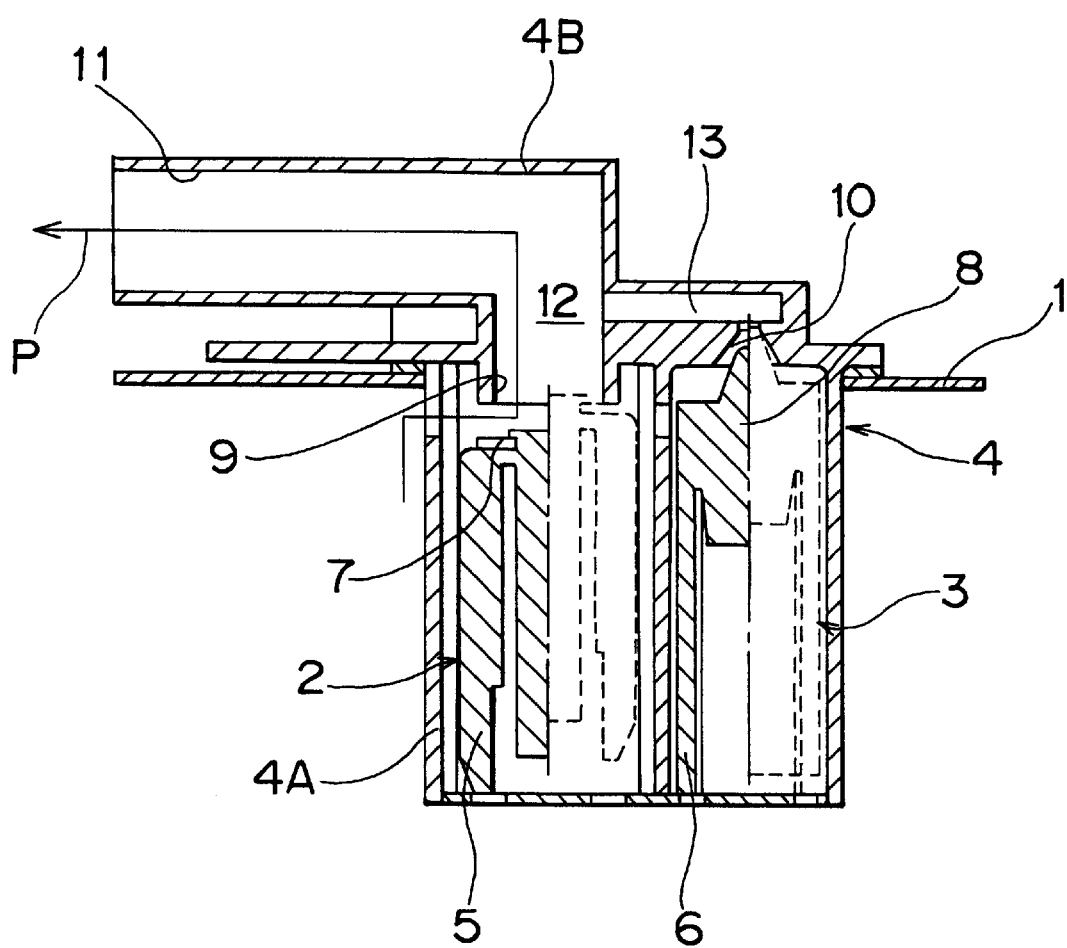
FIG. 1 is a cross-sectional view showing one example of evaporative emission control system as part of the related art.
Figure 2:
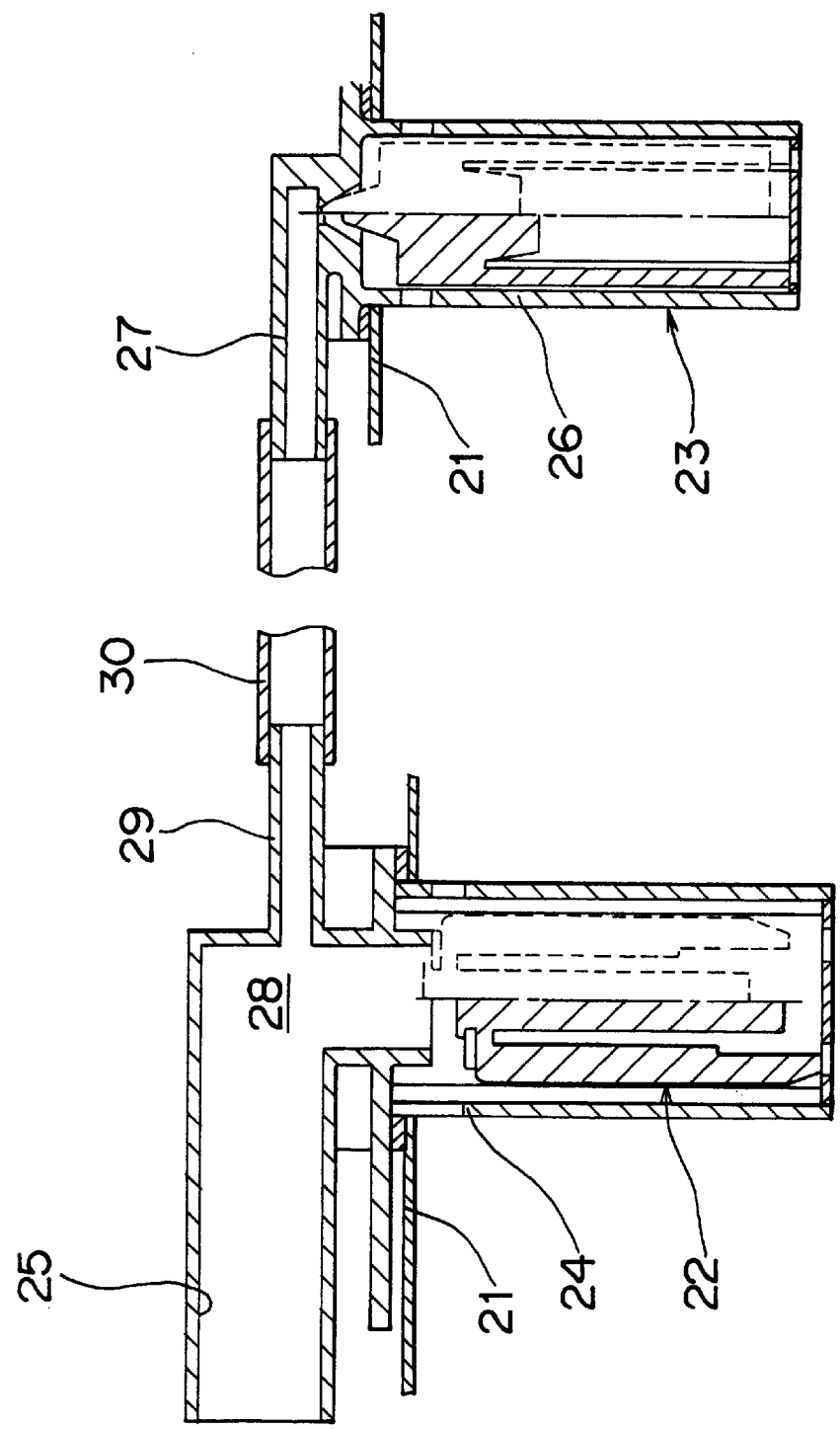
FIG. 2 is a cross-sectional view showing another example of evaporative emission control system as part of the related art.
Figure 11:
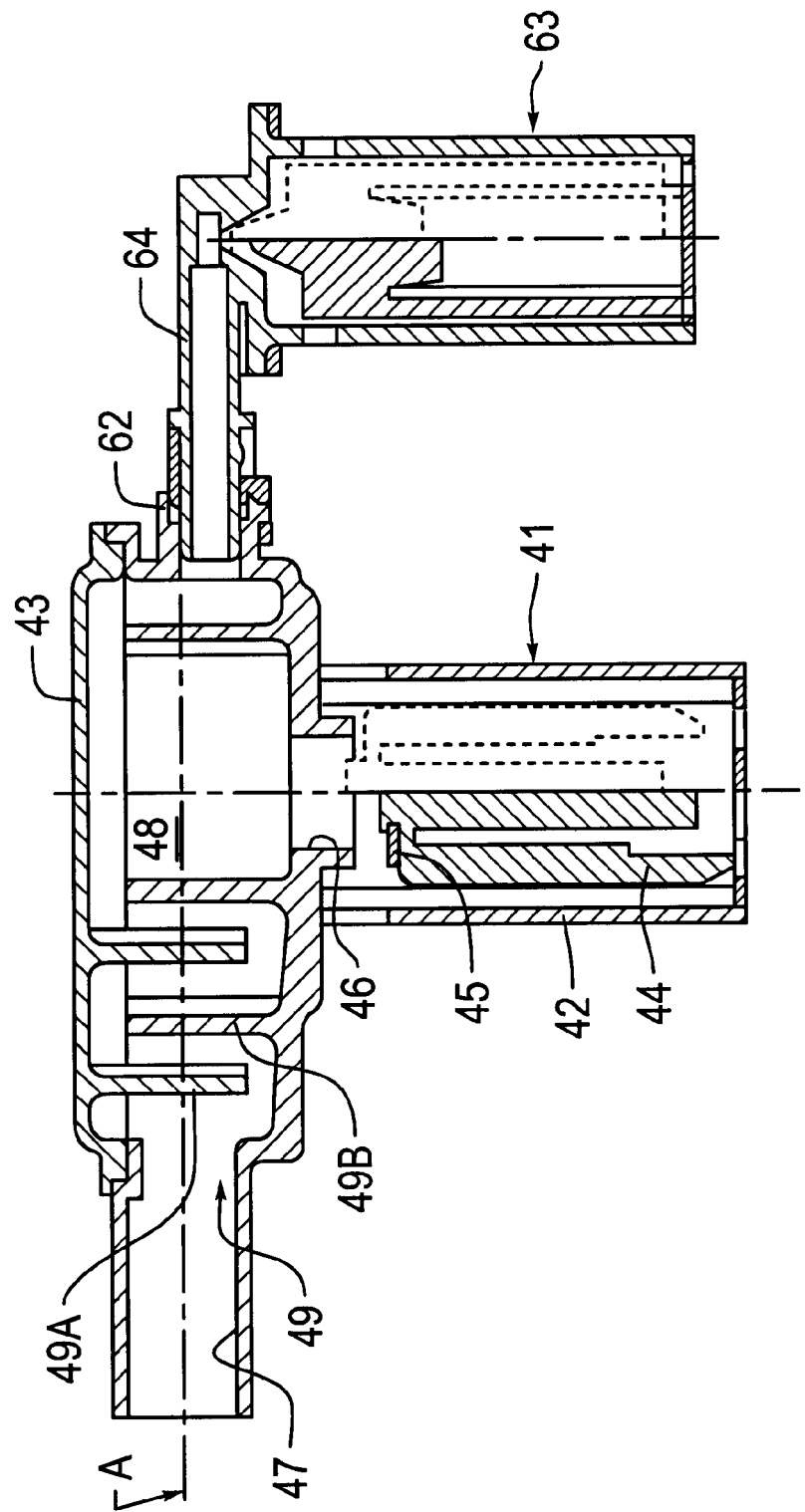
FIG. 11 is a cross-sectional view showing an evaporative emission control system according to the first and fifth embodiment of the invention, wherein a fuel cut valve is disposed separately from a liquid level sensing valve.
Figure 12:
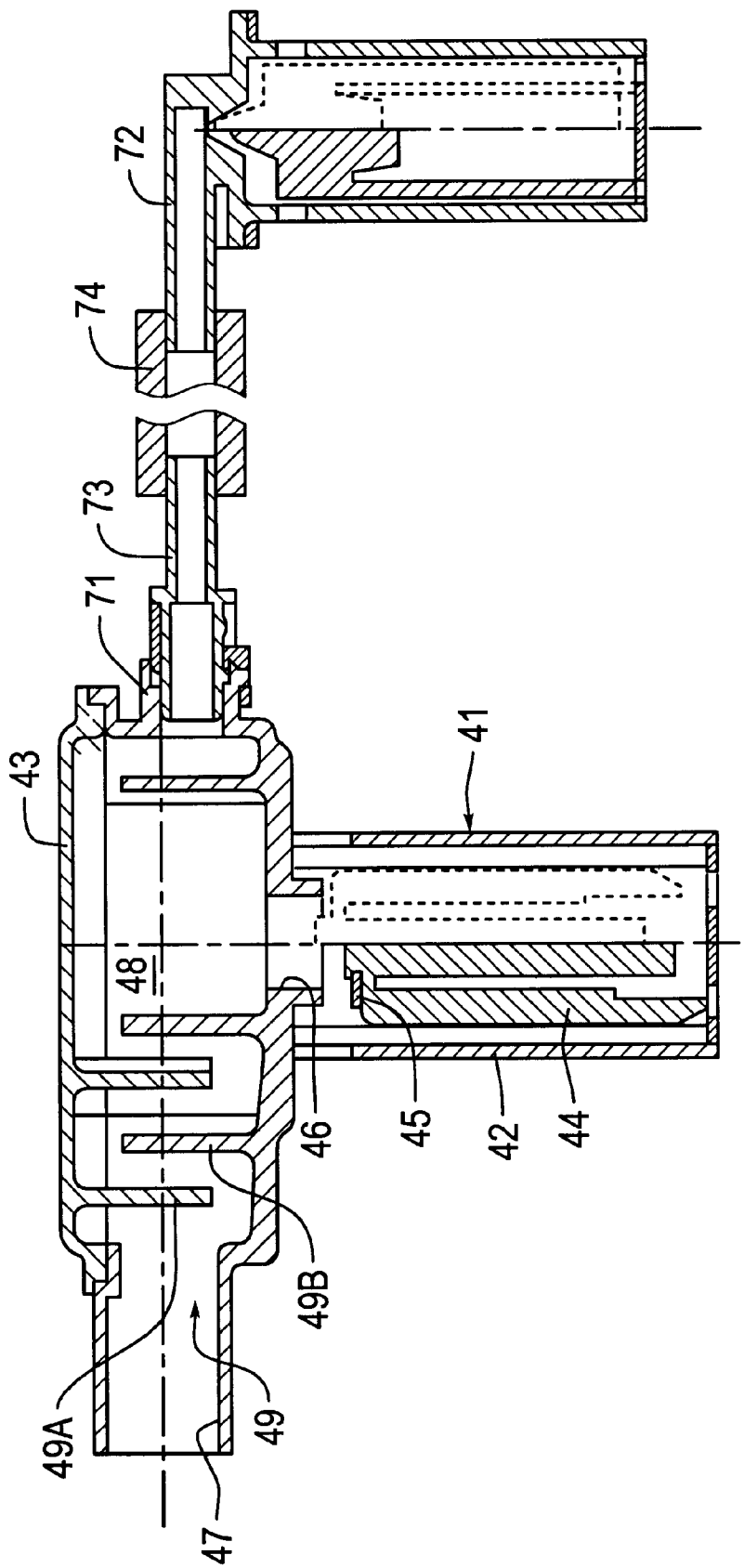
FIG. 12 is a cross-sectional view showing an evaporative emission control system according to the first and sixth embodiments of the invention, wherein a fuel cut valve is disposed separately from a liquid level sensing valve.

The fuel cut valve 63 is illustrated in FIGS. 11 and 12. The fuel cut valve 63 may either be assembled as a unit with the liquid level sensing valve as in the related art shown in FIGS. 1 and 2, or may be disposed separately from the liquid level sensing valve 41, as shown in FIGS. 11 and 12.

In the evaporative emission control system constructed as described above, the shield member 49 prevents fuel from freely flowing through the space in which the member 49 is located, thus making it possible to reduce the amount of fuel leaking out through the valve port 46.

The structure and number of the shield members are not specifically limited. However, it is preferable to alternately arrange the shield members 49A protruding downwards and the shield members 49B protruding upwards, because the amount of leaking fuel can be reduced more effectively.

Figure 5:
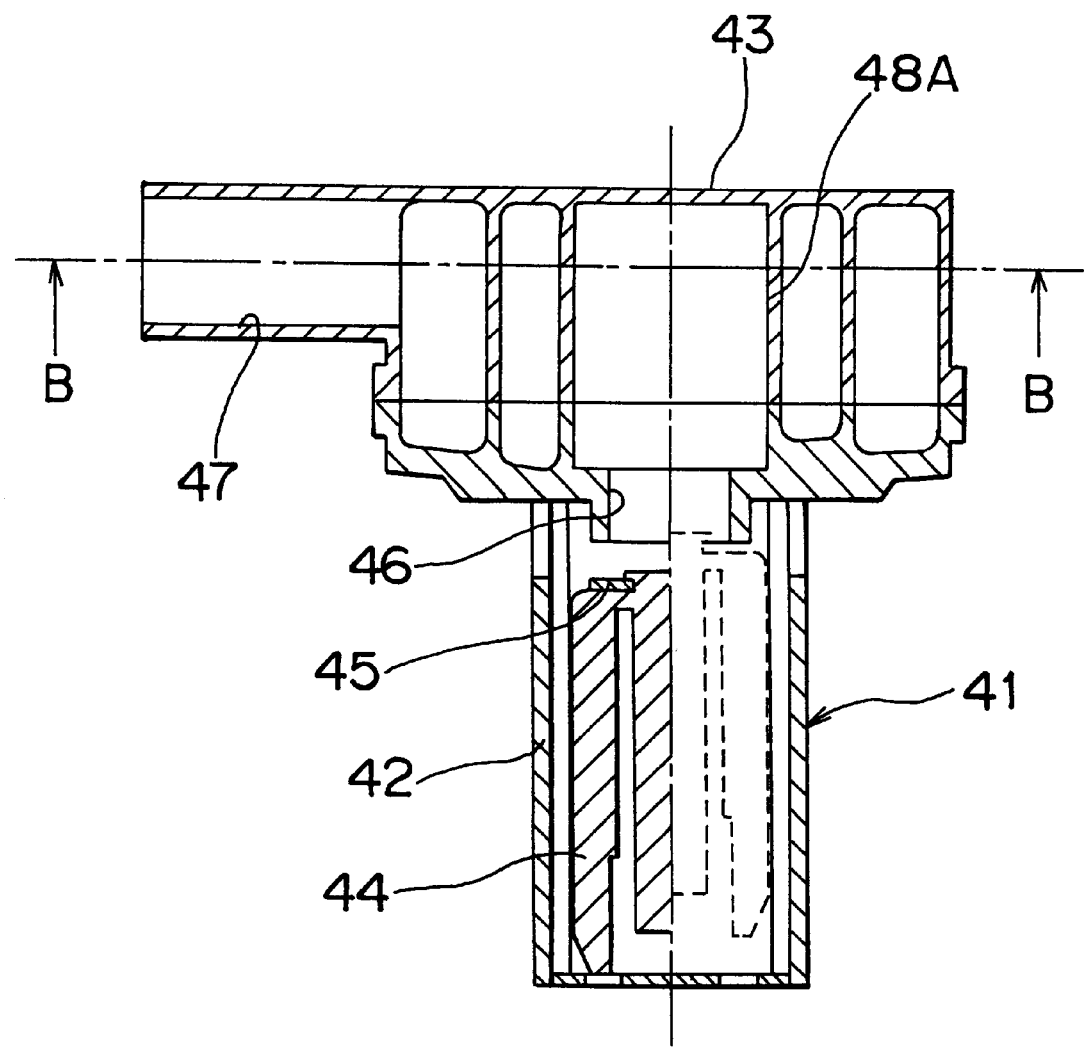
FIG. 5 is a cross-sectional view of an evaporative emission control system according to a second embodiment of the invention.
Figure 6:
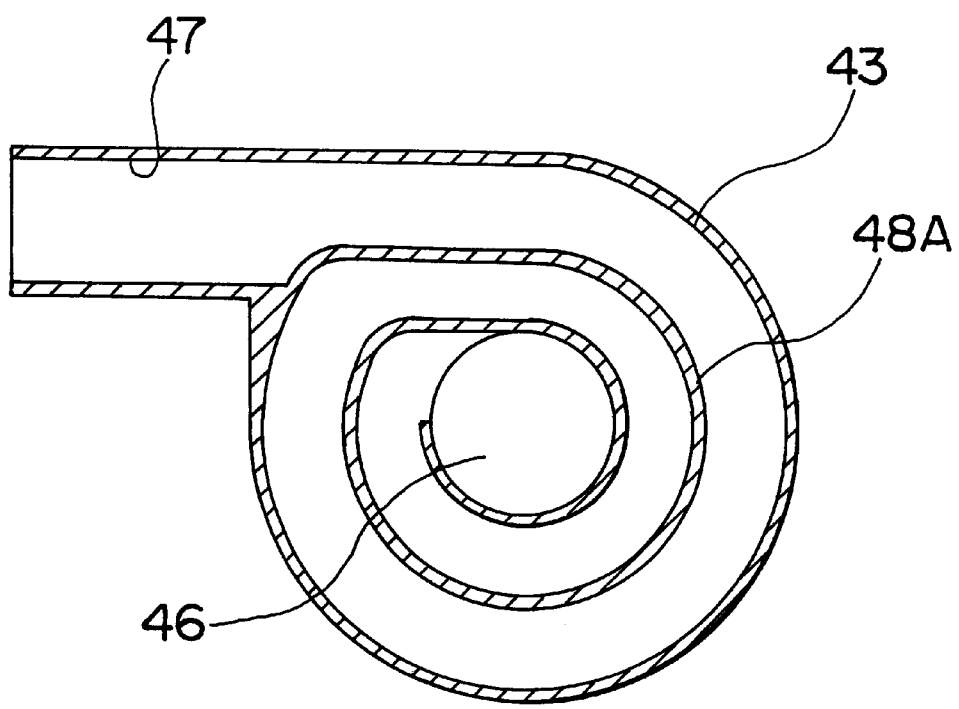
FIG. 6 is a cross-sectional view taken along line B—B of FIG. 5.

The arrangement for obstructing flow of fuel is not limited to that of the first embodiment, but may be that as provided in a second embodiment of the invention shown in FIGS. 5 and 6.

In the space between the valve port 46 and the vent conduit 47 in this embodiment, a helical passage 48A is formed or defined by a helical wall portion that is an integral portion of the upper casing 43. The helical passage 48A may also be defined by a separate member (shield member) provided independently of the upper casing 43. Since other structural components are the same as those of the first embodiment, they are simply denoted by the same reference numerals and will not be described.

Since the helical passage 48A prevents fuel from freely flowing through the space in which the passage 48A is located, it is possible to reduce the amount of fuel leaking out through the valve port 46.

Figure 7:
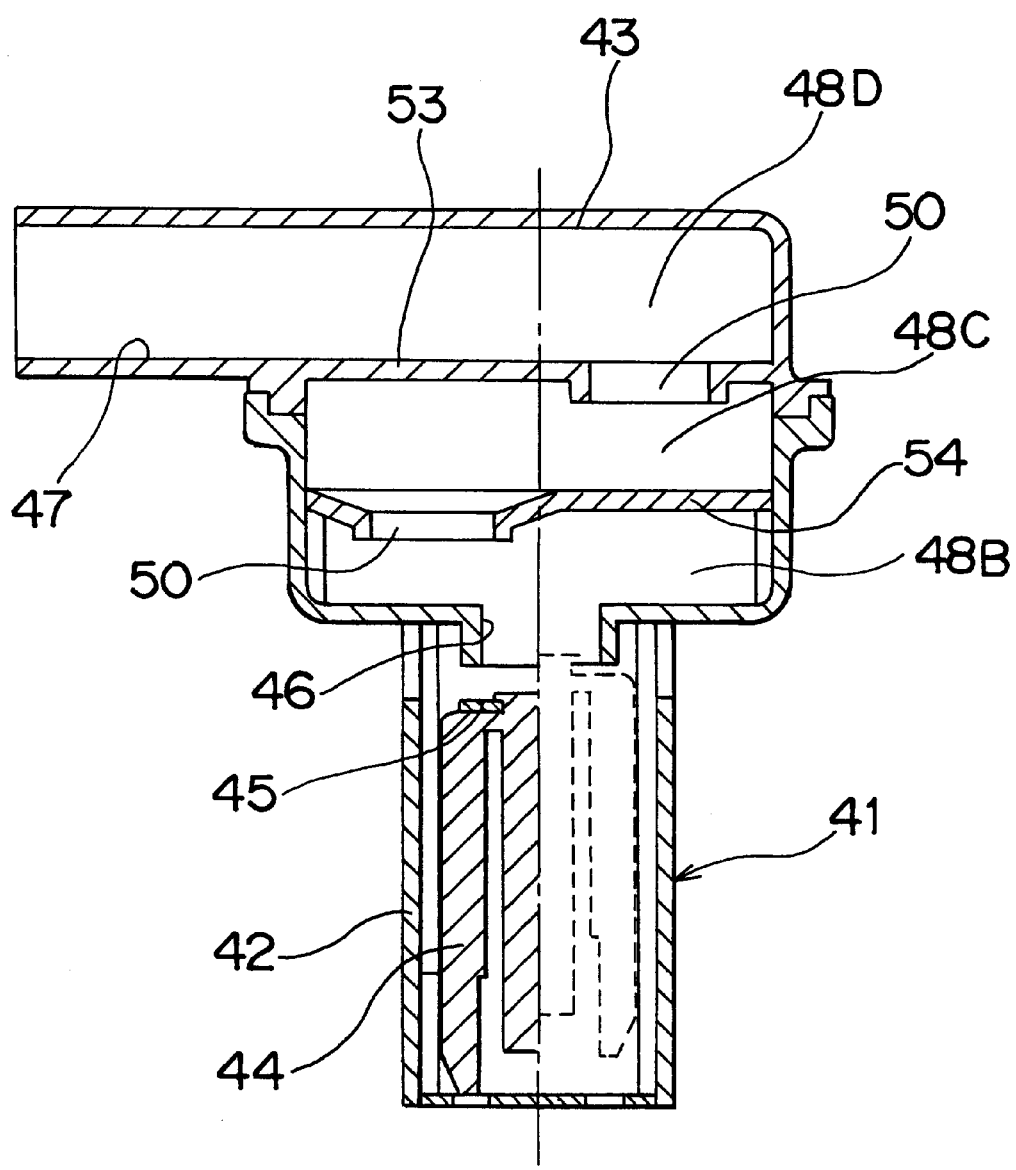
FIG. 7 is a cross-sectional view of an evaporative emission control system according to a third embodiment of the invention.

The arrangement for obstructing flow of fuel is not limited to those of the illustrated embodiments, but may be that as provided in a third embodiment of the invention shown in FIG. 7.

In this embodiment, the space between the valve port 46 and the vent conduit 47 is divided into vertically arranged multi-stage chambers 48B, 48C and 48D. Through-holes 50 are formed in partition walls 53, 54 for defining these chambers 48B, 48C and 48D.

Because other structural components are the same as those of the illustrated embodiments, they are simply denoted by the same reference numerals and will not be described.

With the above arrangement having the multi-stage chambers 48B, 48C and 48D, the partition walls 53, 54 serve to obstruct free flow of fuel through the space between the valve port 46 and the vent conduit 47, and it is therefore possible to reduce the amount of fuel leaking out through the valve port 46.

As shown in FIG. 7, if the through-holes 50 formed in the partition walls 53, 54 are not aligned with each other, that is, if the through-holes 50 are located with their centers offset from each other, the resistance to flow of the fuel is further increased, thus making it possible to further reduce the amount of fuel leaking out through the valve port 46.

Figure 8:
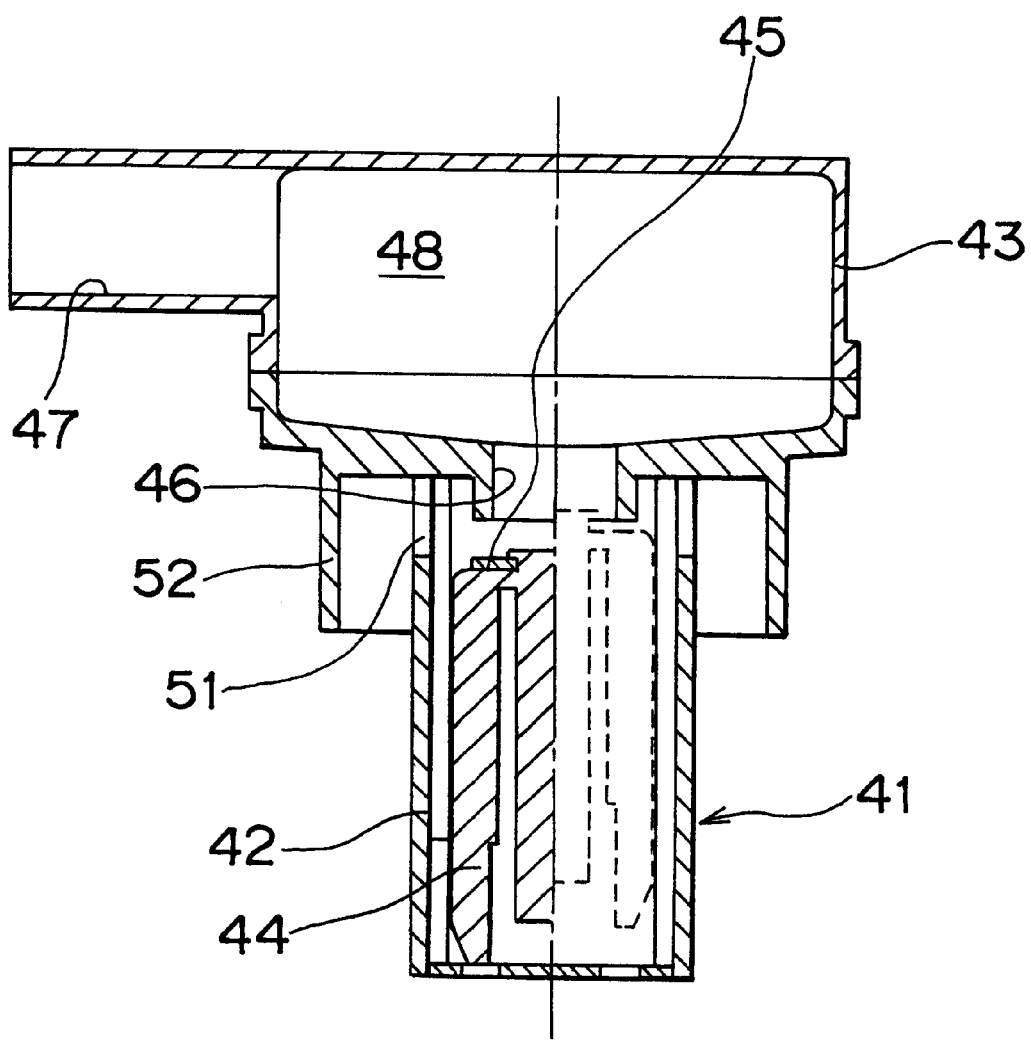
FIG. 8 is a cross-sectional view of an evaporative emission control system according to a fourth embodiment of the invention.

In the aforementioned embodiments, the flow resistance in the space prevents fuel from leaking out through the valve port of the liquid level sensing valve. In a fourth embodiment of the invention as shown in FIG. 8, on the other hand, fuel is prevented from reaching the valve port of the liquid level sensing valve.

More specifically, an inflow opening 51 that allows passage of fuel or fuel vapors therethrough is formed in the lower valve casing 42. A cylindrical cover 52 for covering the inflow opening 51 is formed integrally with or separately from the upper casing 43.

This embodiment may also employ the arrangements of the first to third embodiments. Namely, the shield members may be disposed in the space, or the helical conduit may be formed, or the space may be formed as multi-stage chambers. Also in this embodiment, since other structural components are the same as those of the aforementioned embodiments, they are simply denoted by the same reference numerals and will not be described.

Figure 9:
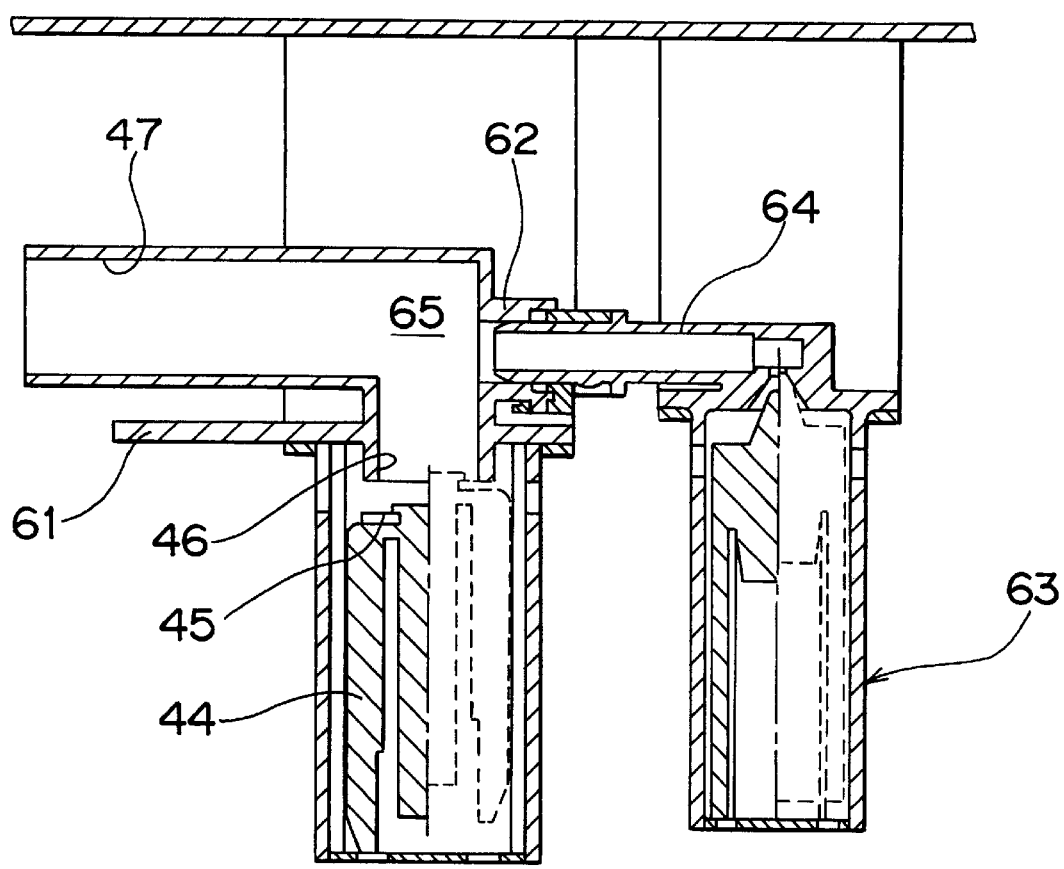
FIG. 9 is a cross-sectional view of an evaporative emission control system according to a fifth embodiment of the invention, wherein a fuel cut valve is disposed separately from a liquid level sensing valve.

Referring next to FIG. 9, an example including a connecting structure between a conduit of a separately provided fuel cut valve and a connection port of a liquid level sensing valve will be described as a fifth embodiment of the invention.

A cut valve connection port 62 is formed in an upper valve casing 61 of the liquid level sensing valve. A vent port 64 of a fuel cut valve 63 is fitted into the cut valve connection port 62, so that the fuel cut valve 63 communicates with a space 65 formed in the liquid level sensing valve.

In this embodiment, the cut valve connection port 62 of the liquid level sensing valve (or the vent port 64 of the fuel cut valve 63) is directly fitted into and connected with the vent port 64 of the fuel cut valve 63 (or the cut valve connection port 62 of the liquid level sensing valve).

In the above embodiment, the cut valve connection port and the vent port of the cut valve are directly connected with each other through a connector structure. However, according to the invention, they may be connected with each other through a hose as shown in FIG. 10.

Namely, a nipple 73 is fitted into a connection port 71 communicating with the space 48 of the liquid level sensing valve. A hose 74 is fitted at one end onto a vent port 72 of the fuel cut valve, and is fitted at the other end onto the nipple 73.

Figure 10:
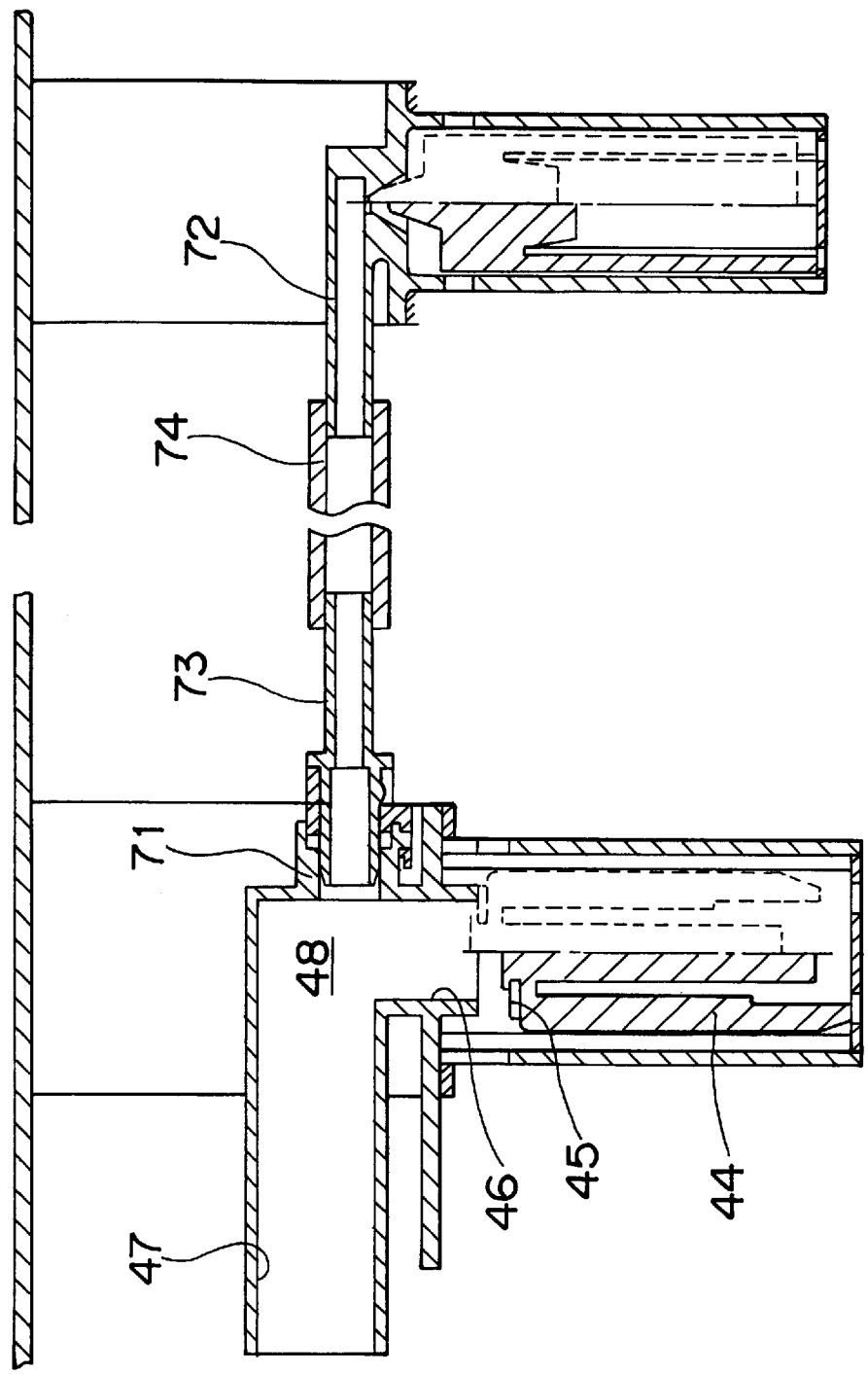
FIG. 10 is a cross-sectional view of an evaporative emission control system according to a sixth embodiment of the invention, wherein a fuel cut valve is disposed separately from a liquid level sensing valve.

The embodiments of FIG. 9 and FIG. 10 may also employ the arrangements of the first to third embodiments. Namely, the shield members may be disposed in the space, or the helical conduit may be formed, or the space may be formed as multi-stage chambers. Also in these embodiments, since other structural components are the same as those of the aforementioned embodiments, they are simply denoted by the same reference numerals and will not be described.

What is claimed is:

1. An evaporative emission control system, comprising:
   an upper valve casing defining a vent conduit;
   a lower valve casing disposed under the upper valve casing;
   a float disposed within the lower valve casing, said float being vertically movable depending upon a liquid level of fuel in a fuel tank, said float including a valve portion that faces the upper valve casing;
   a valve port provided between the upper valve casing and the lower valve casing, said valve port being opened and closed by the valve portion of the float, said upper valve casing defining a space between the vent conduit and the valve port; and
   a flow restricting device disposed in the space of the upper valve casing so as to obstruct flow of fuel from the valve port to the vent conduit, wherein said flow restricting device comprises a shield device that reduces a cross-sectional area of the space through which the valve port communicates with the vent conduit, and wherein said shield device comprises at least one first shield member that extends downwards from an upper wall of the upper valve casing, and at least one second shield member that extends upwards from a lower wall of the upper valve casing.

2. An evaporative emission control system according to claim 1, wherein said at least one first shield member and said at least one second shield member are alternately arranged as viewed in an axial direction of the vent conduit.

3. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port; and a flow restricting device disposed in the space of the upper valve casing so as to obstruct flow of fuel from the valve port to the vent conduit, wherein said flow restricting device comprises a shield device that reduces a cross-sectional area of the space through which the valve port communicates with the vent conduit, and wherein said shield device is formed as an integral part of the upper valve casing.

4. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port; and a flow restricting device disposed in the space of the upper valve casing so as to obstruct flow of fuel from the valve port to the vent conduit;

wherein said flow restricting device defines a helical passage in the space of the upper valve casing.

5. An evaporative emission control system according to claim 4, wherein said flow restricting device is formed as an integral part of the upper valve casing.

6. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port; and a flow restricting device disposed in the space of the upper valve casing so as to obstruct flow of fuel from the valve port to the vent conduit, wherein said flow restricting device comprises at least one partition wall that divides the space of the upper valve casing into two or more chambers that are arranged in a vertical direction, each of said at least one partition wall having a through-hole formed therethrough.

7. An evaporative emission control system according to claim 6, wherein the through-holes of two or more of said at least one partition wall are located such that the centers of the through-holes are offset from each other.

8. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port;

a flow restricting device disposed in the space of the upper valve casing so as to obstruct flow of fuel from the valve port to the vent conduit; and a cylindrical cover that surrounds a portion of the lower valve casing in which an inflow opening for allowing flow of fuel vapors is formed.

9. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port;

a flow restricting device disposed in the space of the upper valve casing so as to obstruct flow of fuel from the valve port to the vent conduit; and a cut valve having a vent port, and wherein said upper valve casing is provided with a cut valve connection port that is open to said space, said vent port of the cut valve being connected to the cut valve connection port.

10. An evaporative emission control system according to claim 9, wherein one of the cut valve connection port and the vent port of the cut valve is directly mounted on the other.

11. An evaporative emission control system according to claim 9, wherein a nipple is mounted in one of the cut valve connection port and the vent port of the cut valve, and a hose is mounted on the nipple and the other of the cut valve connection port and the vent port, so that the cut valve connection port and the vent port of the cut valve are connected to each other.

12. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port; and a cut valve having a vent port, wherein said upper valve casing is provided with a cut valve connection port that is open to said space, said vent port of the cut valve being connected to the cut valve connection port, and wherein one of the cut valve connection port and the vent port of the cut valve is directly mounted on the other.

13. An evaporative emission control system, comprising:

an upper valve casing defining a vent conduit;

a lower valve casing disposed under the upper valve casing;

a float disposed within the lower valve casing, said float being vertically movable depending upon a liquid level of fuel in a fuel tank, said float including a valve portion that faces the upper valve casing;

a valve port provided between the upper valve casing and the lower valve casing, said valve port being opened and closed by the valve portion of the float, said upper valve casing defining a space between the vent conduit and the valve port;

a cut valve having a vent port, wherein said upper valve casing is provided with a cut valve connection port that is open to said space, said vent port of the cut valve being connected to the cut valve connection port; and a nipple is mounted in one of the cut valve connection port and the vent port of the cut valve, and a hose is mounted on the nipple and the other of the cut valve connection port and the vent port, so that the cut valve connection port and the vent port of the cut valve are connected to each other.

* * * * *